(12) United States Patent
De Bonet

(10) Patent No.: US 7,246,360 B2
(45) Date of Patent: Jul. 17, 2007

(54) PLUG-IN API FOR PROTOCOL AND PAYLOAD TRANSFORMATION

(75) Inventor: Jeremy S. De Bonet, N. Andover, MA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

(21) Appl. No.: 10/360,952

(22) Filed: Feb. 7, 2003

(65) Prior Publication Data

US 2003/0177284 A1    Sep. 18, 2003

Related U.S. Application Data

(60) Provisional application No. 60/354,949, filed on Feb. 7, 2002.

(51) Int. Cl.
 *G06F 3/00* (2006.01)
(52) U.S. Cl. .................................... 719/328
(58) Field of Classification Search ............... 719/310, 719/328, 330
See application file for complete search history.

(56) References Cited

U.S. PATENT DOCUMENTS

| | | | |
|---|---|---|---|
| 5,497,434 A | | 3/1996 | Wilson |
| 5,572,675 A | * | 11/1996 | Bergler ................. 719/328 |
| 5,793,771 A | * | 8/1998 | Darland et al. ............ 370/467 |
| 5,825,917 A | | 10/1998 | Suzuki |
| 5,983,228 A | * | 11/1999 | Kobayashi et al. ........... 707/10 |
| 6,005,979 A | | 12/1999 | Chang et al. |
| 6,006,279 A | * | 12/1999 | Hayes ....................... 719/328 |
| 6,009,192 A | | 12/1999 | Klassen et al. |
| 6,101,482 A | * | 8/2000 | DiAngelo et al. ............. 705/26 |
| 6,141,759 A | * | 10/2000 | Braddy ..................... 713/201 |
| 6,199,081 B1 | * | 3/2001 | Meyerzon et al. .......... 715/513 |
| 6,216,112 B1 | * | 4/2001 | Fuller et al. ................ 705/14 |
| 6,525,746 B1 | * | 2/2003 | Lau et al. .................. 715/725 |
| 6,671,728 B1 | * | 12/2003 | Mayberry ................. 709/227 |
| 2002/0116453 A1 | * | 8/2002 | Todorov et al. ............ 709/203 |
| 2002/0194244 A1 | * | 12/2002 | Raventos .................... 709/101 |

FOREIGN PATENT DOCUMENTS

| | | |
|---|---|---|
| GB | 2 356 535 | 5/2001 |
| WO | WO 98/43177 A1 | 10/1998 |

OTHER PUBLICATIONS

Java World, Explore the dynamic proxy API, Nov. 2000.*

(Continued)

*Primary Examiner*—William Thomson
*Assistant Examiner*—LeChi Truong
(74) *Attorney, Agent, or Firm*—Sprinkle IP Law Group

(57) ABSTRACT

Systems and methods for using plug-in modules to process transactions in a proxy, wherein portions of the transaction information such as client requests and corresponding server responses may be transformed before delivery to their destinations. One embodiment comprises an application programming interface (API) implemented in a proxy that enables the use of individual plug-in modules to perform transaction processing, including transformations on requests and/or responses handled by the proxy. In one embodiment, transactions are broken down into stages comprising initializing the transaction, sending an opening statement, getting a request, transforming the request, logging in and obtaining authorization, generating a response, transforming the response, sending the response, and terminating the transaction. Because the proxy uses plug-in modules for the stages, functionality and protocol support can be easily modified, and code re-use is increased.

24 Claims, 5 Drawing Sheets

OTHER PUBLICATIONS

Wi, What is the transform API ?, Feb. 6, 2001.*
International Search Report for PCT/US02/28994, Dec. 4, 2002.
Robert W. Floyd & Louis Steinberg, "*An adaptive algorithm for spatial gray scale*" SID 75 Digest: 36-37, 1975.
Paul Heckbert, "*Color image quantization for frame buffer display*" Computer Graphics, 16(3):297-307, Jul. 1982.
C. E. Shannon, "*A mathematical theory of communication*" The Bell System Technical Journal, 27(3): 379-423, Jul. 1948.
C. E. Shannon, "*A mathematical theory of communication, Part III.*" The Bell System Technical Journal, pp. 623-656, Jul. 1948.
T. A. Welch, "*A technique for high-performance data compression*" Computer, 17(6): 8-19, Jun. 1984.
Jacob Ziv, "*Coding theorems for individual sequences*" IEEE Transactions on Information Theory, 24(4): 405-412, Jul. 1978.
Jacob Ziv & Abraham Lempel, "*A universal algorithm for sequential data compression*" IEEE Transactions on Information Theory, 24(3): 337-343, May 1977.
Jacob Ziv & Abraham Lempel, "*Compression of Individual sequences via variable-rate coding*" IEEE Transactions on Information Theory, 24(5): 530-536, Sep. 1978.
International Search Report for International Application No. PCT/US03/03795, Apr. 6, 2004.
Dragoi, O.A., "The Conceptual Architecture of the Apache Web Server," Dept. of Computer Science, University of Waterloo, http://www.math.uwaterloo.ca/{oadragoi/CS746G/a1/apache_conceptual_arch.html, Jan. 26, 1999, pp. 1-10.
Barrett, R. et al., "Intermediaries: an approach to manipulating information streams," IBM Systems Journal, IBM Corp. Armonk, New York, vol. 38, No. 4, Apr. 21, 1999, pp. 629-641.

* cited by examiner

PLUG-IN API FOR PROTOCOL AND PAYLOAD TRANSFORMATION

RELATED APPLICATIONS

This application claims priority to U.S. Provisional Patent Application No. 60/354,949, entitled "A Plug-In API For Protocol And Payload Transformation," by Jeremy S. de Bonet, filed Feb. 7, 2002 which is hereby fully incorporated by reference herein. Additionally, U.S. Provisional Patent Application No. 60/349,344, entitled "Modular Plug-In Transaction Processing Architecture" by de Bonet et al., filed Jan. 18, 2002 and U.S. Provisional Patent Application No. 60/349,424, entitled "Network Proxy Platform that Simultaneously Supports Data Transformation, Storage, and Manipulation for Multiple Protocols" by de Bonet et al., filed on Jan. 18, 2002, U.S. patent application Ser. No. 10/342,113, entitled "Method and System of Performing Transactions Using Shared Resources and Different Applications," by de Bonet et al., filed Jan. 14, 2003 is incorporated by reference herein.

BACKGROUND

1. Field of the Invention

The invention relates generally to computer and software architectures, and more particularly to systems and methods for constructing network transaction processing platforms that comprise plug-in modules which perform transformations on client requests and server responses.

2. Related Art

A vast majority of the computer systems that are currently in use are not configured strictly as stand-alone devices. In other words, they are coupled to other computers, and possibly other types of devices, through one or more networks. For example, it is typical for a personal computer set up for use at a person's home or business to be connected to the Internet. The computer can therefore communicate with other computers through the Internet.

Many of the communications that occur over the Internet and other networks can be characterized as client—server communications. That is, one computer acts as a server and provides ("serves") data to those who request it. The computers that make the requests serviced by the servers are clients. Communications between clients and servers typically consist of a client generating a request for data and transmitting this request to a server, followed by a server generating responsive data and transmitting this data back to the requesting client.

Many client-server systems incorporate a proxy to improve the efficiency of the system. A proxy is located between the client and server. The proxy receives requests from the client and, if possible, responds to the request without forwarding it to the server. If the proxy cannot provide a response to the request, the request is simply forwarded to the server in the same manner as if the proxy were not present. The proxy thereby reduces the load on the server.

SUMMARY OF THE INVENTION

One or more of the problems outlined above may be solved by the various embodiments of the invention. Broadly speaking, the invention comprises systems and methods for processing transactions between first party and a second party, wherein communications between the parties are transformed using plug-in software modules.

One embodiment of the invention comprises an application programming interface (API). The API defines interfaces for a series of plug-in modules that are configured to perform various stages of processing on transactions that are handled using the API. One or more of the interfaces defined by the API are designed to enable the use of modules that perform transformations on the transactions. Because the API supports the use of plug-in modules, the specific transformation processing that is performed can be easily changed by the replacement of one plug-in module with another.

In one embodiment, the API is implemented in a network proxy application. The proxy application executes on a computer that serves as the hardware platform for the proxy. The proxy receives requests for information from network clients and transmits information responsive to the requests back to the respective clients. The proxy may retrieve the responsive information from its own cache, or it may forward the clients' requests to a server and obtain and the information from the server in response to the forwarded request. The proxy, however, is configured to modify the request, the responsive information, or both. In other words, after the proxy receives the request from the client, the proxy may transform the request in some manner before forwarding the request to the server. Similarly, after the proxy receives responsive information from the server, the proxy may transform this information before the information is forwarded to the client.

The software application and/or API described above are embodied in a computer-readable medium such as a floppy disk, hard disk drive, CD-ROM, DVD-ROM, RAM, ROM, DASD array, magnetic tape, optical storage device and the like. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

The various embodiments of the invention may provide a number of advantages over prior art systems and methods. For example, by transforming client requests and server responses, proxies may be able to provide additional functionality to client-server transactions and improve the performance of the system. Further, by breaking down the processing of transactions into stages and processing each of the stages in a modular fashion, the ability of the system to be modified to provide additional functions or to support additional protocols is greatly increased. Still further, by extending the API to include plug-in functionality, new modules can be created by parties other than the producer of the server application and plugged into the system without the need to expose source code.

BRIEF DESCRIPTION OF THE DRAWINGS

Other objects and advantages of the invention may become apparent upon reading the following detailed description and upon reference to the accompanying drawings.

Figure 1:
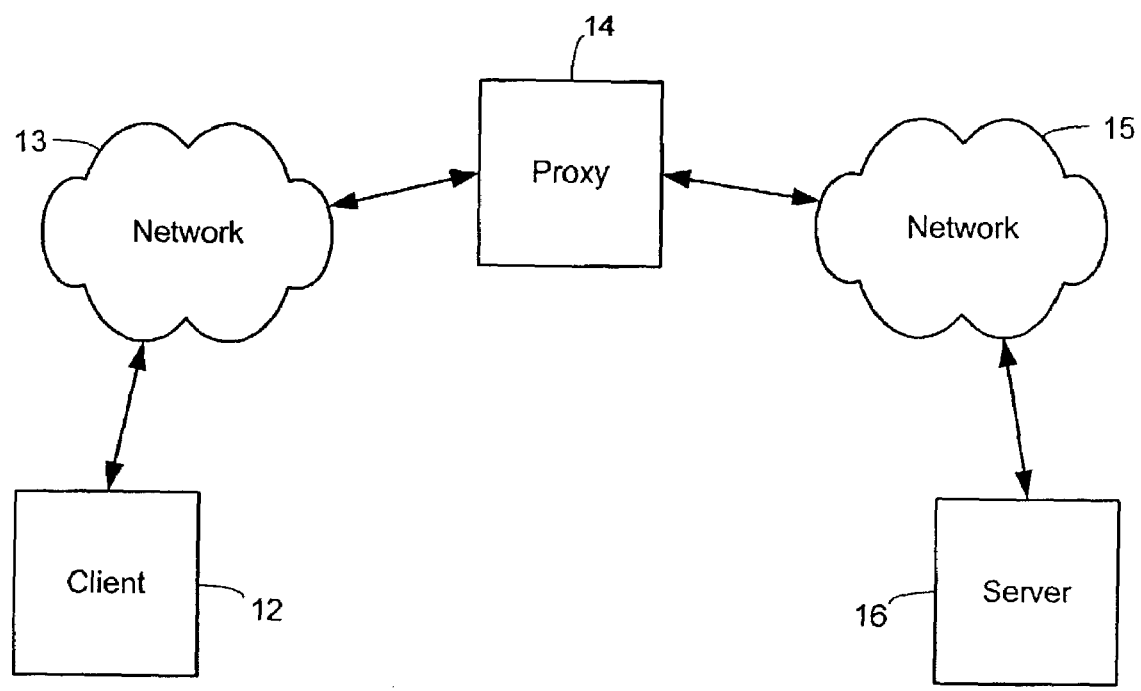
FIG. 1 is a diagram illustrating some of the basic components of a network system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

One or more preferred embodiments of the invention are described below. It should be noted that these and any other embodiments described below are exemplary and are intended to be illustrative of the invention rather than limiting.

Broadly speaking, the invention comprises systems and methods based on plug-in modules, for receiving and processing client requests in a proxy, wherein the requests and responses thereto may be transformed before delivery to the server and/or client.

One embodiment of the invention comprises an application programming interface (API) that enables the use of individual plug-in modules to perform transformations on requests and/or responses handled by the proxy. The API also defines interfaces for a plurality of plug-in modules that perform different stages of the processing of the transaction comprising the request and response. The API is implemented in a proxy application that is designed to handle network transactions between the client and server. In one embodiment, transactions are broken down into seven stages, including initializing the transaction, sending an opening statement, getting a request, logging in and obtaining authorization, generating a response, sending the response, and terminating the transaction. A set of plug-in modules, each one corresponding to one of the stages, is also provided. The plug-in modules use the API to pass transaction information from one module to the next and to thereby completely process (and transform, if necessary) the request and response of the transaction. Depending upon the type of communication that is being carried on between two parties, different sets of plug-in modules can be installed to provide different processing, such as providing different functionality or supporting different protocols.

The various embodiments of the invention may provide a number of advantages over prior art systems and methods. For example, by transforming client requests and server responses, proxies may be able to provide additional functionality to client-server transactions and improve the performance of the system. Further, by breaking down the processing of transactions into stages and processing each of the stages in a modular fashion, the adaptability of the system may be increased. For instance, the system may be adaptable to provide additional functions or to support additional protocols. Still further, by extending the API to include plug-in functionality, new modules can be created by parties other than the producer of the server application and plugged into the system without the need to expose source code.

It should be noted that, while the description of the various embodiments contained in this disclosure focus on the use of a network proxy to handle communications between a client and a server, other embodiments of the invention may involve proxies that handle communications between entities that do not have a client-server relationship.

One embodiment of the invention is implemented in a network environment. Referring to FIG. 1, a diagram illustrating some of the basic components of a network system is shown. As depicted in this figure, the system comprises a client 12, a proxy 14 and a server 16. Client 12 is coupled to proxy 14 via a first network 13, while Server 16 is coupled to proxy 14 via a second network 15. Proxy 14 may include a memory or storage device (not shown) for caching data received from server 16.

It should be noted that the network configuration illustrated in FIG. 1 is intended to be exemplary rather than limiting. Other embodiments may employ alternative configurations. For example, there may be multiple clients and multiple servers that are interconnected by multiple individual networks. Alternatively, a client may be directly coupled to a server without an intervening network. Many such variations are possible.

The communications between client 12 and server 16 comprise network transactions. In a typical transaction, client 12 generates a request and transmits the request via network 13 to proxy 14. Proxy 14 then takes one of two actions. If proxy 14 can provide a response to the request, it generates the response and returns the response to client 12. If proxy 14 cannot provide a response to the request, it forwards the request via network 15 to server 16. Upon receiving the request, server 16 processes the request and generates a response to the request. This response is returned to proxy 14, which then forwards the response to client 12. Client 12 normally cannot distinguish between responses generated by server 16 and those generated by proxy 14.

In the present systems and methods, proxy 14 does not simply forward and/or respond to client requests and server responses, but also performs transformations on the requests and responses. These transformations may be broken down into "upstream" transformations (i.e., modifications of client requests) and "downstream" transformations (i.e., modifications of server responses). The upstream transformations may be useful, for example, when it is desirable to control a client's access to resources, or to provide additional information to the server which is not included in the client's original request. The downstream transformations may be used, for example, to remove information that is present as a result of an upstream transformation by proxy 14, or to modify data (e.g., compress image files) to more closely match the capabilities of the client device.

Communications between client 12, proxy 14 and server 16 (as well as networks 13 and 15) can be accomplished using electronic, optical, radio-frequency, or other signals. For example, client 12 may convert signals received from proxy 14 and server 16 to a human understandable form and may convert input from a human understandable form to appropriate electronic, optical, radio-frequency, or other signals to be used by proxy 14 or server 16. Similarly, when an operator is at server 16, server 16 may convert the signals to a human understandable form when sending a communication to the operator and may convert input from a human understandable form to appropriate electronic, optical, radio-frequency, or other signals to be used by proxy 14 or client 12.

Figure 2:
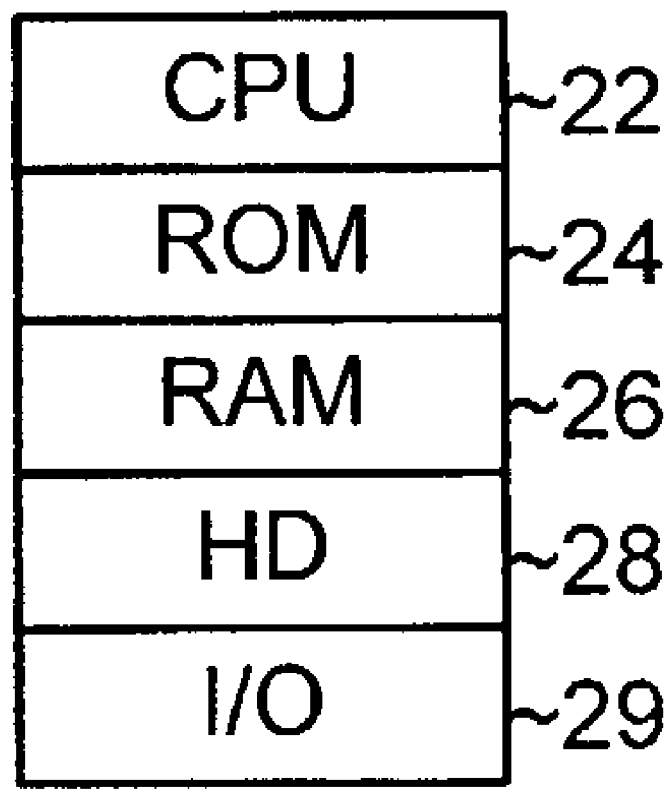
FIG. 2 is a diagram illustrating the components of an exemplary computer system that can be used as a platform for the client, proxy or server in one embodiment.

In one embodiment, each of client 12, proxy 14 and server 16 is implemented in a corresponding computer system. These computer systems may comprise general purpose desktop computers, laptop computers, or other types of devices capable of communicating over the networks and processing the information communicated between them. Referring to FIG. 2, a diagram illustrating the components of an exemplary computer system is shown. The computer system illustrated in this figure may be used as a platform for client 12, proxy 14 or server 16.

As shown in FIG. 2, computer system 20 comprises a central processing unit ("CPU") 22, read-only memory ("ROM") 24, random access memory ("RAM") 26, hard disk drive ("HD") or storage memory 28, and input/output device(s) ("I/O") 29. I/O 29 can include a keyboard, monitor, printer, electronic pointing device (e.g., mouse, trackball, stylus, etc.), or the like.

The computer systems that provide platforms for the client and server may each have more than one CPU, ROM, RAM, HD, I/O, or other hardware components. For simplicity, the computer illustrated in FIG. 2 is depicted in as having one of each of the listed hardware components. It should be noted that FIG. 2 is a simplification of an exemplary hardware configuration. Many other alternative hardware configurations are possible and known to persons of skill in the art.

"Computer" and "computer system," as used herein, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

As explained above, the different protocols that can be supported and functionalities that can be provided by different proxies and servers may result from the use of different software applications. The support of different protocols and functionalities is facilitated in the present embodiment by running a modular software application on the proxy computer. More particularly, the software application uses an API that enables individual plug-in modules to be used to perform different stages of the processing of network transactions.

Figure 3:
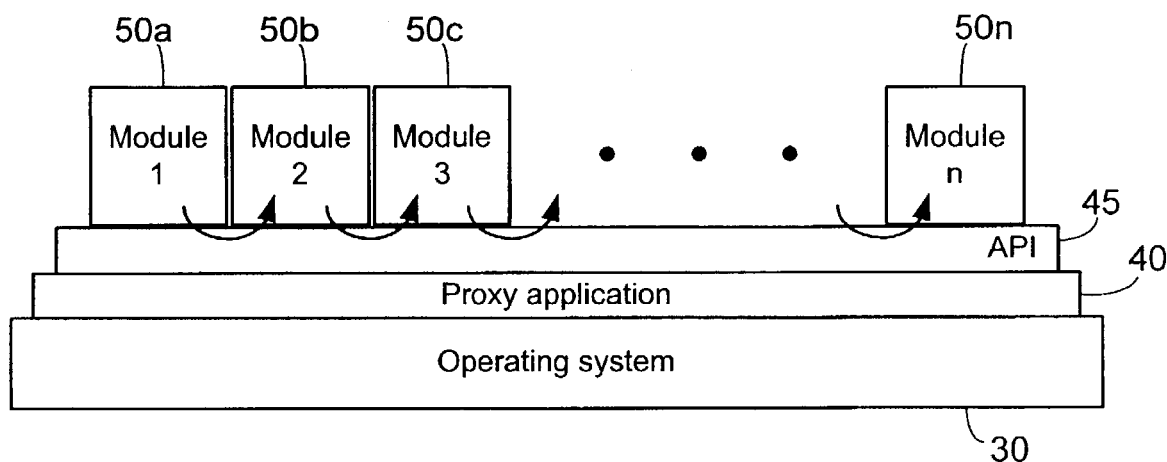
FIG. 3 is a diagram illustrating the modular structure of a proxy application in accordance with one embodiment.

Referring to FIG. 3, a diagram illustrating the structure of a proxy application in accordance with one embodiment is shown. As shown in the figure, a network proxy application 40 runs on top of the operating system 30 of the proxy computer. Network proxy application 40 includes an API 45 through which the application interfaces with a plurality of plug-in modules 50. Plug-in modules 50 perform the processing of transactions handled by the proxy. The flow of data from one module to another is indicated by the arrows extending from one module to the next. The data is transferred between modules via API 45.

It should be noted that, for the purposes of this disclosure, like items in the figures may be indicated by the same reference number, followed by a lowercase letter, e.g., 50a, 50b, and so on. The items may be collectively referred to herein simply by the reference number, without the lowercase letter. It should also be noted that "n" is used herein (e.g., "50n") to indicate a variable number, rather than to specifically indicate the 14th item in a series of items (i.e., because n is the 14th letter in the alphabet).

A subset of plug-in modules 50 correspond to the different stages of transaction processing that occur in almost all network proxies. These stages include: initializing the transaction; sending an opening statement; getting a request; logging in and obtaining authorization; generating a response; sending the response; and terminating the transaction. Additionally, in this embodiment, plug-in modules 50 include a module that transforms requests received from the client, and a module that transforms responses received from the server. These stages, particularly the transformation of requests and corresponding responses, will be described in more detail below. It should be noted that, while the present embodiment utilizes the specific modules described below, other embodiments may partition the processing of transactions in a different manner and may therefore use a different number of stages that include different portions of the overall processing.

Each of modules 50a–50n performs the processing for a corresponding portion of the overall processing of the transaction. In one embodiment, each module performs its processing, then passes the resulting information to the next module, which performs its processing, and so on, until the transaction is completely processed. Thus, in the case of a network proxy situated between a client and server, a client request would be received by module 50a, which would begin processing the request and then pass its results to module 50b. Module 50b would process the information received from module 50a and then pass its results to module 50c. This would be repeated for each module, concluding with module 50n, which would transmit the response to the original request back to the client.

As indicated above, one embodiment of the present system includes modules for transformation of the client requests and server responses in addition to modules for the normal processing of the transactions. The transformation modules include an upstream module and a downstream module. The upstream module is designed to transform a request that is received from the client before a response to the request is generated, while the downstream module is designed to transform the response to the request before the response is returned to the client. In one embodiment, the proxy application and/or the API are configured to enable caching of the transformed response data.

Just as the processing performed by each of the non-transformation modules corresponds to a particular stage in the overall processing of the transaction, the transformations performed by each of the transformation modules can also be considered stages in the processing of the transaction. The relationship of these stages is illustrated in FIG. 4.

Figure 4:
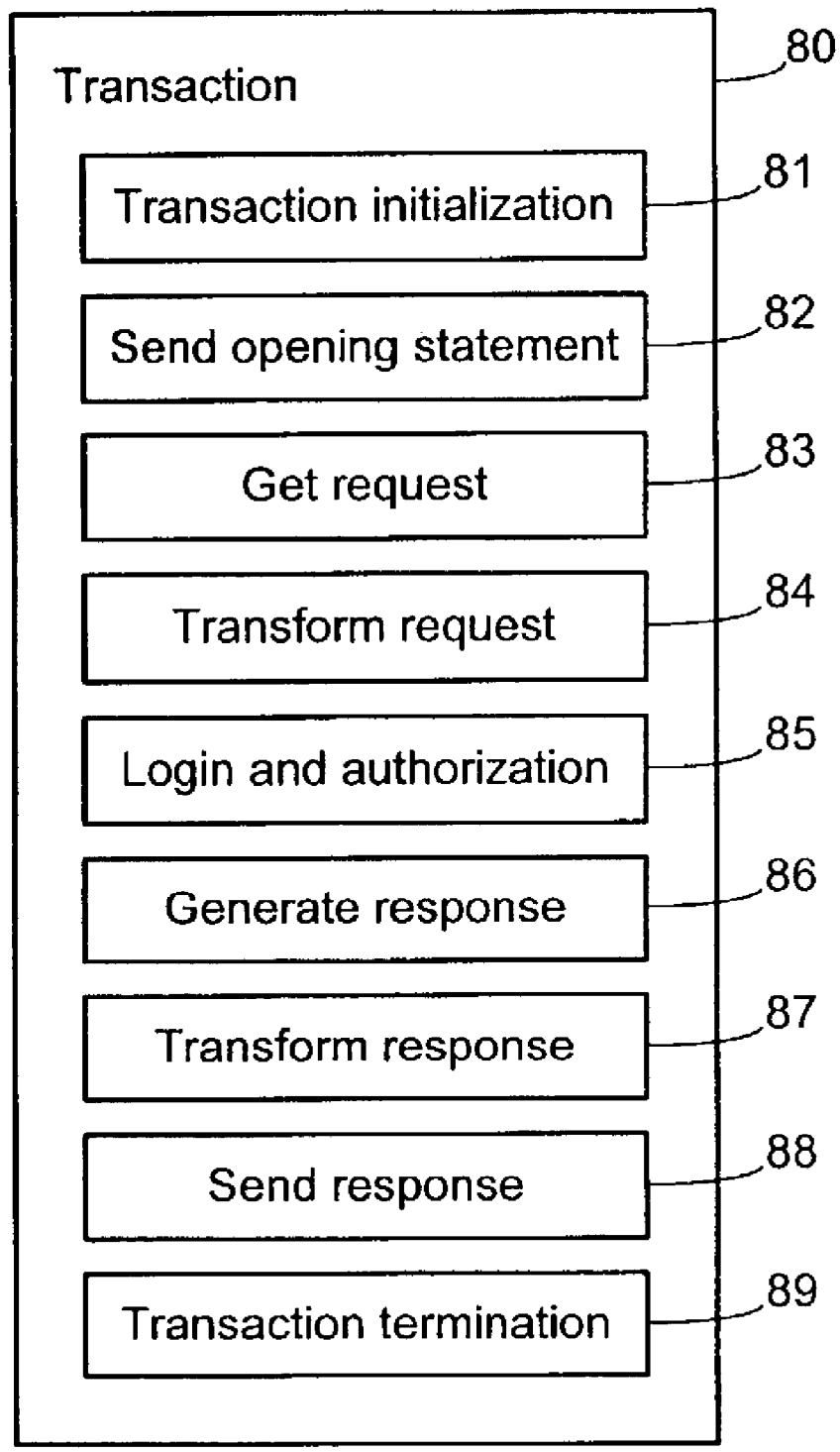
FIG. 4 is a diagram illustrating the relationship of the stages of processing of a network transaction in accordance with one embodiment.

Referring to FIG. 4, a diagram illustrating the stages of processing of a client-server transaction in accordance with one embodiment is shown. As depicted in the figure, the non-transformation stages of the processing comprise initializing the transaction; sending an opening statement, getting a request; logging in and obtaining authorization; generating a response; sending the response; and terminating the transaction. These processing stages are described in more detail in U.S. patent application Ser. No. 10/342,113 entitled "Method and System of Performing Transactions Using Shared Resources and Different Applications," by de Bonet et al., filed Jan. 14, 2003, which is incorporated by reference herein. Upstream transformation ("transform request") stage 84 immediately follows "get request" stage 83. Downstream transformation ("transform response") stage 87 immediately precedes "send response" stage 88.

Proxies typically cache responses received from the server so that later requests for the same information can be serviced by the proxy. That is, upon receiving the same request again, the proxy can respond directly by retrieving the responsive data from the cache and sending this data to the client. The data sent to the client is the same data previously provided by server. In the present embodiment, the proxy is configured to cache the transformed response rather than the response provided by the server. Thus, the proxy can respond to later, identical requests without having to send a transformed request to the server or to transform the received response.

It should be noted that the relative positions of these stages may vary in other embodiments. For example, the processing corresponding to upstream transformation stage 84 and downstream transformation stage 87 could immediately precede and follow, respectively, "generate response" stage 88. The stages need not even be separate. In another embodiment, the processing of both upstream transformation stage 84 and downstream transformation stage 87 could be included in the processing of "generate response" stage 88.

The particular type of transformation processing implemented in the present systems and methods may vary from one embodiment to another. For example, in one embodiment, the upstream transformation processing may consist of identifying a resource which the client is attempting to access via the request, determining whether the client is authorized to access this resource and, if the client is not authorized to access the requested resource, the request may be modified to identify a different resource for which the client has access authorization. In another example, the upstream transformation processing may consist of adding information to the request before forwarding it to the server. Such information might include information relating to the client device (e.g., device type or location), or information relating to usage of the requested resource (e.g., an account number to which the resource service should be billed).

The processing embodied in the downstream transformation may also vary from one embodiment to another. For example, it may not be necessary or desirable to include information that is added to the request by the upstream module in the response that is transmitted back to the client. The downstream transformation may therefore consist of removing this information from the response before the response is forwarded to the client. In another example, the downstream transformation may consist of adding cache control headers to the response in order to facilitate coordination of caches in the proxy and client. In yet another example, the transformation may consist of manipulation of images within the responsive data (e.g., color reduction or compression of images).

This system may provide a number of advantages over the prior art. For example, proxies in the prior art typically do not perform any type of transformation on the requests or responses better communicated between the client and server, so the present system may provide additional capabilities through the transformations. Further, because the system is designed to use plug-in modules for the processing of the transactions between the client and server, the capabilities of a particular proxy can be easily modified by replacing one or more current modules with new modules that provide the desired functionality. Still further, because the modules are plugged into an API that exposes the functionality required to plug modules into the proxy application, these modules can be created by parties other than the producer of the proxy application.

Figure 5:
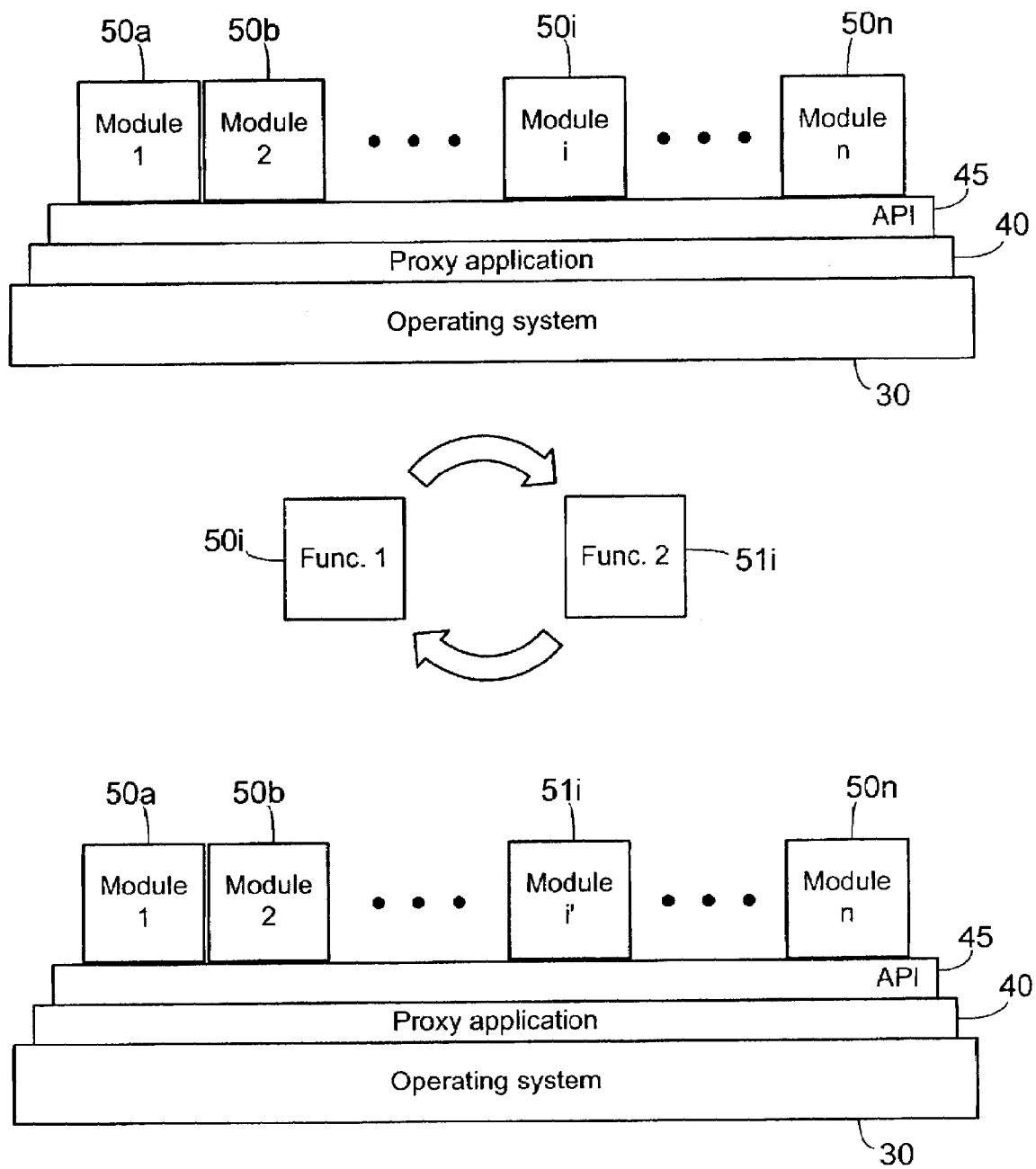
FIG. 5 is a diagram illustrating the replacement of a plug-in module to the proxy application in accordance with one embodiment.

Referring to FIG. 5, a diagram illustrating the replacement of a plug-in module to the transaction processing application is shown. In this example, the application is first configured with plug-in modules 50a–50n. Module 50i is configured to perform the upstream transformation of received requests. In order to modify the manner in which the requests are transformed, it is only necessary to provide a new plug-in module, 51i, that provides the desired transformation functionality and to replace the original module, 50i, with the new module, 51i. It should be noted that any one or more of plug-ion modules 50a–50n may be replaced in this manner. The replacement of the modules may be employed to modify the functionality of the system (e.g., to transform requests in a different manner), or to support different protocols. It should also be noted that the proxy application may instantiate multiple processing pathways, so that different types of transactions can be handled by the proxy in different ways. The operation of the proxy can therefore be easily modified by replacement of individual plug-in modules, rather than the rewriting or replacement of the entire proxy application.

The embodiments described above the focus on the higher-level system of the proxy. It should be noted that alternative embodiments of the invention may comprise the proxy application itself, or even the API that enables the use of the plug-in transformation modules. The details of an API in accordance with one embodiment are described below.

In this embodiment, the API comprises an upstream API and a downstream API. The upstream API is responsible for rewriting the client request, and potentially responding directly to it. The downstream API is used after the rewritten request is issued by the proxy on behalf of the client. The downstream module is applied to the response from the content server, and is able to transform both the response header and the response content before it is sent back to the client.

The upstream API includes a formal declaration for a plug-in module that performs the upstream transformation. In one embodiment, the formal declaration for this module may be as follows.

```
typedef bool (*UpstreamModule)
(
            // outputs
            Header          & hdrOut,
            Buffer          & buffOut,
            Log             & logSummary,
            bool            & backToClient,
            Parameters      & parameters,
            // inputs
            const Header    & hdrRequest,
            const Buffer    & BuffRequest,
            const int         fallbackOrder
);
```

The general process performed by the upstream module comprises transforming the request header into the output header, and optionally providing an output buffer that is sent directly to the client when backToClient is set to true. Setting backtoclient to true circumvents sending the transformed request to an external content server and subsequently calling the downstream transformation module.

New upstream modules can be installed using the function:

```
void InstallUpstreamModule(const char *sName,   UpstreamModule fxn);
```

Existing upstream modules can be called from within other modules using the function:

```
bool ExecUpstreamModule(
            const char *sName,
            // module arguments
            Header          & hdrOut,
            Buffer          & buffOut,
            Log             & logSummary,
            bool            & backToClient,
            Parameters      & parameters,
            const Header    & hdrRequest,
            const Buffer    & buffRequest
            const int         fallbackOrder
);
```

The general process performed by the downstream module comprises transforming the content server response header and response buffer into the output header and buffer. The output header and buffer are then sent to the requesting client.

```
typedef bool (*DownstreamModule)
(
            // outputs
            Header          & hdrOut,
            Buffer          & buffOut,
            Log             & logSummary,
            // inputs
            const Header    & hdrReceived,
            const Buffer    & buffReceived,
            const Header    & hdrRequest,
            const Buffer    & buffRequest
            const int         fallbackOrder,
            const Parameters & parameters
);
```

A downstream module can be registered with the following function. Additionally, this function takes a NULL terminated list of parameter names. The values for these parameter names are used in one embodiment to distinguish between cache entries. In order for transformed content to be pulled from the cache in this embodiment, all parameters in this list must exactly match values corresponding to the pulled content. The values of any parameters which are used by this module but not in this list will not be considered when checking for a cache hit.

```
void InstallDownstreamModule(
            const char *sName, DownstreamModule fxn, ...
);
```

Existing downstream modules can be called from within other modules using the following function.

```
bool ExecDownstreamModule(
            const char *sName,
            // module arguments
            Header          & hdrOut,
            Buffer          & buffOut,
            Log             & logSummary,
            const Header    & hdrReceived,
            const Buffer    & buffReceived,
            const Header    & hdrRequest,
            const Buffer    & buffRequest
```

-continued

```
            const int         fallbackOrder,
            const Parameters & parameters
);
```

By decomposing a network proxy into these two modular stages using the API specified herein, the creation of new modules (potentially by third parties) which allow for different functionality is made easier than with methods in the prior art.

Portions of the methods described herein may be implemented in suitable software code that may reside within ROM 24, RAM 26, hard disk drives 28 or other computer-readable media within the system. The software code may also be contained on a separable data storage device, such as a removable hard disk, or on removable computer-readable media such as a DASD array, magnetic tape, floppy diskette, optical storage device, or the like. In one embodiment, the software code may comprise lines of compiled $C^{++}$, Java, or other language code.

The various software components may reside on a single computer or on any combination of separate computers. Other configurations may also be used. For example, the functions of proxy 14 may be implemented in multiple computers that interact to perform the functions of the proxy. Additionally, a computer program or its software components within such code may be embodied in more than one computer-readable medium. Similarly, components of the software may reside on multiple computers.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A software program product embodied in a computer-readable medium, comprising program instructions executable to implement:
   an application programming interface (API) for a network proxy application;
   wherein the API defines a series of interfaces to a series of plug-in processing modules, each interface corresponding to one of the series of plug-in processing modules;
   wherein the series of plug-in processing modules are configured to perform stages of processing of a network transaction between a client and a server;

wherein one or more interfaces correspond to the stages of processing of the network transaction between the client and the server;

wherein at least one interface corresponds to a transformation stage of processing of the network transaction between the client and the server;

wherein the transformation stage is operable to manipulate a message by manipulating a header of the message, data of the message or both; and wherein the stages of processing comprise, in addition to the transformation stage: initializing the network transaction; getting a request; logging in and obtaining authorization; generating a response; sending the response; and terminating the network transaction.

2. The software program product of claim 1, wherein the at least one interface corresponding to the transformation stage comprises a first interface corresponding to an upstream transformation stage and a second interface corresponding to a downstream transformation stage.

3. The software program product of claim 1, wherein the at least one interface corresponding to the transformation stage comprises an interface corresponding to transformation of a client request.

4. The software program product of claim 1, wherein the at least one interface corresponding to the transformation stage comprises an interface corresponding to transformation of a server response.

5. The software program product of claim 1, wherein at least one interface corresponds to a stage of processing in which a client request is transformed.

6. The software program product of claim 5, wherein at least one interface corresponds to a stage of processing in which a server response is transformed.

7. The software program product of claim 1, wherein at least one interface corresponds to a stage of processing in which a server response is transformed.

8. The software program product of claim 1, wherein the network proxy application is configured to dynamically install a plug-in module corresponding to the transformation stage.

9. The software program product of claim 1, wherein the stages of processing further comprise sending an opening statement.

10. The software program product of claim 1, further comprising one or more plug-in modules corresponding to the one or more interfaces, wherein each of the plug-in modules corresponds to a unique stage of processing of the transaction.

11. The software program product of claim 10, wherein the stages comprise, in addition to the transformation stage: initializing the transaction; getting a request; logging in and obtaining authorization; generating a response; sending the response; and terminating the transaction.

12. The software program product of claim 11, wherein the stages of processing further comprise sending an opening statement.

13. A computer implemented method for processing transactions, comprising:

defining a series of interfaces embodied in a network proxy application to a series of plug-in processing modules, each interface corresponding to one of the series of plug-in processing modules;

partitioning each network transaction between a server and a client into a plurality of stages of processing;

wherein one or more interfaces correspond to the stages of processing of the network transaction between the client and the server;

configuring the series of plug-in processing modules to correspondingly perform the stages of processing of the network transaction between the server and the client;

wherein at least one interface corresponds to a transformation stage of the stages of processing of the network transaction between the server and the client;

wherein the transformation stage is operable to manipulate a message by manipulating a header of the message, data of the message or both; and wherein the stages of processing comprise, in addition to the transformation stage: initializing the network transaction; getting a request; logging in and obtaining authorization; generating a response; sending the response; and terminating the network transaction.

14. The method of claim 13, wherein the stages include initializing the transaction, sending an opening statement, getting a request, transforming the request, logging in and obtaining authorization, generating a response, transforming the response, sending the response, and terminating the transaction.

15. The method of claim 13, further comprising providing at least one plug-in processing module corresponding to the at least one interface, wherein the at least one plug-in processing module performs a transformation.

16. The method of claim 15, further comprising receiving a client request, wherein the transformation comprises transformation of the client request.

17. The method of claim 15, further comprising receiving a server response, wherein the transformation comprises transformation of the server response.

18. The method of claim 15, wherein providing the at least one plug-in processing module corresponding to the at least one interface comprises dynamically installing the at least one plug-in processing module.

19. The method of claim 18, wherein dynamically installing the at least one plug-in processing module comprises dynamically de-installing a current plug-in processing module and dynamically installing the at least one plug-in processing module in place of the de-installed plug-in processing module.

20. The method of claim 13, wherein the one or more interfaces include a first interface corresponding to an upstream transformation processing plug-in module and a second interface corresponding to a downstream transformation processing plug-in module.

21. The method of claim 20, further comprising: receiving a client request, wherein the upstream transformation comprises transformation of the client request; and receiving a server response, wherein the downstream transformation comprises transformation of the server response.

22. The method of claim 20, further comprising dynamically installing at least one of the upstream transformation processing plug-in module and the downstream transformation processing plug-in module.

23. A software program product embodied in a computer-readable medium, comprising program instructions executable to implement:

an application programming interface (API) for a network proxy application;

wherein the API defines a series of interfaces to a series of plug-in processing modules, each interface corresponding to a unique plug-in processing module in the series of plug-in processing modules;

wherein the series of plug-in processing modules are configured to perform stages of processing of a network transaction between a server and a client;

wherein one or more interfaces correspond to the stages of processing of the network transaction between the client and the server;

wherein at least one interface corresponds to a transformation stage of processing of the network transaction between the server and the client;

wherein the transformation stage is operable to manipulate a message by manipulating a header of the message, data of the message or both; and wherein the stages of processing comprise, in addition to the transformation stage: initializing the network transaction; getting a request; logging in and obtaining authorization; generating a response; sending the response; and terminating the network transaction.

24. A computer system programmed to implement the method according to claim 13.

* * * * *